(12) United States Patent
Ryan

(10) Patent No.: US 10,742,579 B2
(45) Date of Patent: *Aug. 11, 2020

(54) METHODS AND SYSTEMS FOR ANALYSIS AND/OR CLASSIFICATION OF INFORMATION

(71) Applicant: Firstwave Technology Pty Ltd, North Sydney, NSW (AU)

(72) Inventor: Simon David Ryan, Glen Waverly (AU)

(73) Assignee: Firstwave Technology Pty Ltd., North Sydney, New (AU)

( * ) Notice: Subject to any disclaimer, the term of this patent is extended or adjusted under 35 U.S.C. 154(b) by 574 days.

This patent is subject to a terminal disclaimer.

(21) Appl. No.: 15/424,469

(22) Filed: Feb. 3, 2017

(65) Prior Publication Data

US 2017/0169347 A1 Jun. 15, 2017

Related U.S. Application Data

(63) Continuation of application No. 13/810,389, filed as application No. PCT/AU2011/000896 on Jul. 15, 2011, now Pat. No. 9,813,367.

(60) Provisional application No. 61/344,407, filed on Jul. 16, 2010.

(51) Int. Cl.
| | |
|---|---|
| *H04L 12/58* | (2006.01) |
| *G06Q 10/10* | (2012.01) |
| *G06Q 30/02* | (2012.01) |
| *G06N 5/04* | (2006.01) |

(52) U.S. Cl.
CPC ............. *H04L 51/12* (2013.01); *G06N 5/047* (2013.01); *G06N 5/048* (2013.01); *G06Q 10/107* (2013.01); *G06Q 30/02* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,296,009 | B1 * | 11/2007 | Jiang | .................. G06F 16/3347 |
| 7,693,945 | B1 * | 4/2010 | Dulitz | ..................... H04L 51/12 709/206 |
| 7,792,353 | B2 | 9/2010 | Forman | |
| 7,870,118 | B2 * | 1/2011 | Jiang | .................. G06F 16/3347 707/706 |
| 8,166,030 | B2 * | 4/2012 | Ryan | ..................... G06F 16/954 707/736 |
| 8,782,781 | B2 * | 7/2014 | Dulitz | ..................... H04L 51/12 726/22 |
| 9,813,367 | B2 * | 11/2017 | Ryan | ..................... G06N 5/047 |
| 9,961,029 | B2 * | 5/2018 | Dulitz | ................. G06Q 10/107 |
| 2005/0193076 | A1 | 9/2005 | Flury et al. | |
| 2005/0198142 | A1 | 9/2005 | Yamakami | |
| 2006/0036693 | A1 | 2/2006 | Hulten et al. | |
| 2009/0094342 | A1 | 4/2009 | Leiba et al. | |

(Continued)

*Primary Examiner* — Michael B Holmes
(74) *Attorney, Agent, or Firm* — Jones Day

(57) ABSTRACT

Methods and systems for analysis and/or classification of electronic message information so as to capture and identify salient objects exchanged during electronic message passing in order to impute certain information about the object, groups of objects, the message, groups of messages, the parties, communities involved in the message exchange or combinations, thereof.

23 Claims, 13 Drawing Sheets

(56) References Cited

U.S. PATENT DOCUMENTS

2014/0325007 A1\* 10/2014 Dulitz .................... H04L 51/12
   709/206

\* cited by examiner

TYPICAL BUSINESS FLOW

TYPICAL BROADCAST FLOW

TYPICAL NON-BUSINESS FLOW

TYPICAL LOGO (PAYLOAD) FLOW

DATA STORE

DISTRIBUTED COLLECTOR

GATEWAY

VIEWER REPORTER

Figure 12
TYPICAL DISPLAY

MANUAL CLASSIFICATION

METHODS AND SYSTEMS FOR ANALYSIS AND/OR CLASSIFICATION OF INFORMATION

CROSS-REFERENCE TO RELATED APPLICATIONS

This application is a continuation of U.S. application Ser. No. 13/810,389, filed Jul. 29, 2014, which is the National Phase application of International Application No. PCT/AU2011/000896, filed 15 Jul. 2011, which designated the Untied Sates and was published in English, which claims the benefit of U.S. Provisional Application No. 61/344,407, filed on Jul. 16, 2010. Each of these applications are herein incorporated by reference in their entirety.

TECHNICAL FIELD

The technical field of the present disclosure relates to analysis and/or classification of electronic message information.

BACKGROUND

There are a number of types of directed electronic message streams in common use, such as: emails, short message service (SMS), instant messaging (IM), social media, blogs, faxes, really simple syndications (RSS), etc. This list continues to grow as new message streams are developed and implemented. The effective analysis and/or categorization of the digital information contained within these message streams continues to be a problem for many companies and other organizations. In addition, the typo and volume of these encoded payloads is growing significantly and the techniques for analyzing and/or categorizing the content has become problematic.

For example, the growth in email messages passing between multiple senders and recipients, as both one to one and, one to many directed messages continues to expand. These messages can contain both textual information, meta data and zero or more attachments in the form of encoded payloads. Encoded payloads typically consist of office documents or multimedia documents but may include other information such as URLs. Some examples of these payloads are: word (or similar) documents, presentation (PowerPoint or similar) documents, adobe documents (pdfs), spread sheets (excel or similar) documents, images formatted as jpegs, gifs, pngs, tiffs, videos formatted as avis, asfs, mkvs, mpegs, audio formatted as mp3s, aiffs, wavs, URLs or document IDs etc.

In certain environments, such as the work place, the growth in electronic message information has resulted in several management issues or problems. For a number of reasons, companies and other organizations have a growing need to better understand the content and be able to categorize the electronic message information that is being circulated. For example, valuable IT storage space is being used for things such as non-work related videos, personal emails, etc. The percentage of non-business emails and attachments that are received and transferred around within a network continues to grow. In addition, the proliferation of potentially inappropriate inbound and outbound activity (such as pornography, cyber-bullying, sensitive materials that could be stolen and mailed out of the company) has become a serious problem for many organizations. There is a growing need for organizations to analyze and/or categorize directed electronic message streams efficiently. Some methods have been developed to categorize electronic message streams, however, these have not proven to be sufficient enough to take the actual context and content film the electronic message streams and use this information for categorizing the content.

Among the problems with known systems is that only very basic metadata and data/contents of electronic message streams are used for categorization. However, this misses out on the context of different electronic message streams, which can often be important in achieving successful analysis and/or categorization.

A compelling need has been recognized in connection with providing efficient and effective analysis and/or categorization of the digital content of these electronic message stream. The present disclosure addresses these and other problems that exist in the art.

SUMMARY

Embodiments disclosed herein solve these problems and other problems and provide certain advantages as described herein. The present inventions will now be described in detail with reference to one or more embodiments of the inventions, examples of which are illustrated in the accompanying drawings. The examples and embodiments are provided by way of explanation only and are not to be taken as limiting to the scope of the inventions. Furthermore, features illustrated or described as part of one embodiment may be used with one or more other embodiments to provide a further new combination. It will be understood that the present inventions will cover these variations and embodiments as well as variations and modifications that would be understood by the person skilled in the art.

There are a number of types of directed message streams in common use, such as: Emails, Short Message Service (SMS), Instant messaging (IM), Social Media, Blogs, Faxes, Really simple syndications (RSS) etc. Certain methods and systems disclosure herein may be used with these messaging forms and combinations thereof. In addition, it is contemplated that the present disclosure will be applicable to other directed electronic message streams that may be deployed in the future.

For purposes of illustrating the embodiments, the disclosure focuses on email systems as the source of the directed message stream. However, for the sake of clarity, email is understood to include other messaging forms and the methods and systems enunciated for email may also apply across other messaging forms.

Other aspects, features, and advantages will become apparent from the following detailed description when taken in conjunction with the accompanying drawings, which are a part of this disclosure and which illustrate, by way of example, principles of the inventions disclosed.

Certain embodiments disclose an algorithmic method by which a large quantity of messages is analyzed in such a way as to capture and identify salient objects exchanged during electronic message passing.

Certain embodiments disclose a method(s) of analyzing or characterizing electronic message information comprising the steps of: receiving electronic message information data; breaking down the electronic information data into components and selecting properties of these components as features; combining the features selected to classify the electronic message information data; and optionally displaying the classified electronic message information.

Certain embodiments disclose a method(s) of classifying electronic message information comprising the steps of:

receiving electronic messages from a live stream source, from an offline source, or combinations thereof; breaking down the electronic messages received into component parts; extracting at least one selected object and/or at least one flow pattern from the component parts; combining the at least one selected object and/or at least one flow pattern in order to analyze and predict classification of the received electronic messages; classify the electronic messages based at least in part on the analysis and predicted classification of the received electronic messages; and optionally displaying the classified electronic messages.

Certain embodiments disclose a method(s) of classifying electronic message information comprising the steps of: receiving an electronic message from a live stream source or from an offline source; extracting at least one selected object and/or at least one flow indicator from the electronic message; assigning a signature value to the at least one selected object; storing the signature valve and the flow indicator from the electronic message; comparing the signature value assigned to the electronic message database of signature values and assigning a class to the electronic message; combining the at least one selected object and/or at least one flow pattern in order to analyze and predict classification of the received electronic messages; placing the electronic message in the assigned class; and repeating the process on the next electronic message.

Certain embodiments disclose a method(s) of classifying electronic message information comprising the steps of: receiving an electronic message from a live stream source in substantially real time; breaking down the electronic message received into component parts; extracting at least one selected object and/or at least one flow pattern from the component parts; combining the at least one selected object and/or at least one flow pattern in order to analyze and predict classification of the received electronic messages; assigning a signature value to the at least one selected object and/or at least one flow pattern; comparing the signature value assigned to a database of signature values and assigning a class to the electronic message; placing the electronic message in the assigned class in substantially real time; and repeating the process on the next electronic message.

Certain embodiments are directed to a method of classifying information comprising: receiving an electronic message; breaking down the electronic message received into component parts; extracting at least one selected object or at least one flow pattern from the component parts; combining and comparing the at least one selected object or the at least one flow pattern with objects or flow patterns observed in other electronic messages, in order to predict classification of the at least one selected object. In certain aspects, the electronic message is received from at least one stream source or from an offline source. In certain aspects, the comparing further includes an occurrence count that is associated with the at least one selected object. In certain aspects, the occurrence count is determined by observing or counting related events that are associated with the movement of the electronic message. In certain aspects, the occurrence count is determined by counting the receipts, log files or events associated with the observation of message movement. In certain aspects, the occurrence count is the electronic message frequency count associated with selected subcategories. In certain aspects, the selected subcategory is a domain part of the address. In certain aspects, the occurrence count is determined by measuring the volume flow and comparing to the occurrence count. In certain aspects, the occurrence count is determined based on a passage of time. In certain aspects, the passage of time is 1, 2, 3, 4, 5, 6, 7, 8, 9 or 10 seconds. In certain aspects, the passage of time is 1, 2, 3, 4, 5, 6, 7, 8, 9, 10, 30, 45 seconds, 1, 5, 10, 30, 60 minutes, 1, 5, 10, 20 hours, 1 day, 2 days or 1 week or greater. In certain aspects, the occurrence count is at least 2, 3, 4, 5, 6, 7, 8, 9 or 10. In certain aspects, the occurrence count is at least 2, 3, 4, 5, 6, 7, 8, 9, 10, 25, 50, 100, 200, 300, 400, 500, 600, 700, 800, 900, 1000 or greater. In certain aspects, the electronic message is one or more of the following: emails, short message service (SMS), instant messaging (IM), social media, blogs, faxes, or web feeds including, really simple syndications (RSS) and Atom. In certain aspects, the occurrence count is determined by examining the email occurrence counts between source and destinations. In certain aspects, the selected objects from the electronic message share common selected objects with other electronic message and where the selected objects are identifiable by reduction to a signature. In certain aspects, at least one signature associated with the selected object is stored as a signature in a database. In certain aspects, the resulting predicted classification is used to identify the electronic message as either desirable or undesirable. In certain aspects, the at least two occurrence counting approaches are combined to determine the occurrence count. In certain aspects, the predicted classification method is repeated on a second electronic message. In certain aspects, one or more steps of the method may be performed in substantially real time.

In certain embodiments, the method of classifying electronic messages comprising: receiving an electronic message from a live stream source in substantially real time; breaking down the electronic message received into component parts; extracting at least one selected object or at least one flow pattern from the component parts; combining the at least one selected object or at least one flow pattern in order to predict classification of the received electronic messages; assigning a signature value to the at least one selected object; comparing the signature value assigned to a database of signature values and assigning a class to the electronic message; placing the electronic message in the assigned class in substantially real time; and repeating the process on the next electronic message.

In certain embodiments, the method of analyzing data from electronic message information comprising: receiving electronic message data; breaking down the electronic message data into components and selecting properties of these components as features; combining the features selected to classify the electronic message data; and optionally displaying some portion of the electronic message information. In certain aspects, the combined features are compared with other features observed in other electronic messages, in order to classify the electronic message. In certain aspects, the features identified may be used to infer information about the features, groups of features, the electronic message, the senders of the electronic message or some other properties associated with the electronic message. In certain aspects, the electronic message has a defined sender and one or more defined recipient addresses and wherein the addresses define the sender and recipients. In certain aspects, the electronic message moves from sender to recipients by way of a transport layer. In certain aspects, the feature may be a definable binary or text component and wherein the components may be reduced to an identifier by way of a fuzzy reduction algorithm, hashing function or combinations, thereof. In certain aspects, the identifiers are stored in a secondary storage system for the purposes of later retrieval. In certain aspects, the information inferred about the components is calculated by analyzing one or more features associated with the electronic message. In certain aspects, the features may be collected from electronic messages passing through a single node, may be collected from multiple nodes over a distributed collection framework or combinations, thereof. In certain aspects, features may be extracted from the content of the electronic message, from information associated with the transport layer used to transport the electronic message or combinations, thereof. In certain aspects, features associated with the transport layer may be extracted from the electronic message addresses and used to determine message path traversal. In certain aspects, an algorithm is used to generate an output that combines the information inferred about the components which is calculated by analyzing one or more features associated with the electronic message, and these features may be collected from electronic messages passing through a single node, may be collected from multiple nodes over a distributed collection framework or combinations, thereof and the features associated with the transport layer may be extracted from the electronic message addresses and used to determine message path traversal resulting in the output which defines the information about the features, groups of features, the electronic message, the senders of the electronic message or some other properties associated with the electronic message. In certain aspects, the inferred information matches a defined classification schema. In certain aspects, the output is stored so that it is suitable for distribution over a computer network. In certain aspects, the objects are stored in a secondary storage system in association with the identifiers where the object may be a definable binary or text component and the components may be reduced to an identifier by way of a fuzzy reduction algorithm, hashing function or combinations, thereof. In certain aspects, the objects are subjected to a further summarization process for the purposes of making summarization information available to a visualization system. In certain aspects, the electronic message data is received from at least one stream source, from an offline source or combinations, thereof. In certain aspects, the method further includes an occurrence count that is associated with the at least one selected feature. In certain aspects, the occurrence count is determined by observing or counting related events that are associated with the movement of the electronic message. In certain aspects, the occurrence count is determined by counting the receipts or log files. In certain aspects, the occurrence count is the electronic message frequency count associated with selected subcategories. In certain aspects, the selected subcategory is a domain part of the address. In certain aspects, the occurrence count is determined by measuring the volume flow and comparing to the occurrence count. In certain aspects, the occurrence count is determined based on a passage of time. In certain aspects, wherein the passage of time is 1, 2, 3, 4, 5, 6, 7, 8, 9, 10, 30, 45 seconds, 1, 5, 10, 30, 60 minutes, 1, 5, 10, 20 hours, 1 day, 2 days or 1 week or greater. In certain aspects, the occurrence count is at least 2, 3, 4, 5, 6, 7, 8, 9 or 10. In certain aspects, the occurrence count is at least 2, 3, 4, 5, 6, 7, 8, 9, 10, 25, 50, 100, 200, 300, 400, 500, 600, 700, 800, 900, 1000 or greater. In certain aspects, the electronic message is one or more of the following: emails, short message service (SMS), instant messaging (IM), social media, blogs, flutes or really simple syndications (RSS). In certain aspects, the selected features from the electronic message share common selected features with other electronic message and where the selected features are identifiable by reduction to a signature. In certain aspects, wherein at least one signature associated with the selected features is stored as a signature in a database. In certain aspects, the at least one stored signature may be visualized by the presentation of a dynamically generated or previously stored summarization information for the purposes of optional manual reclassification of the object into en alternate classification stored within the at least one database of signature values. In certain aspects, at least one of the at least one signature databases have been made available to at least one distributed classification engine for the purposes of classifying messages. In certain aspects, the inferred information is used to modify the message, the message routing, generate new messages or generate other electronic actions. In certain aspects, the flow pattern is an evaluation of selected communication patterns and this is coupled with the analysis of selected objects to impute a classification for the object, groups of objects, the message, groups of messages or the parties, communities involved in the message exchange or combinations, thereof.

Certain embodiments are directed to a computer program product, comprising a computer readable medium said computer program comprising: computer program code for receiving an electronic message; computer program code for breaking down the electronic message received into component parts; computer program code for extracting at least one selected object or at least one flow pattern from the component parts; computer program code for combining and comparing the at least one selected object or the at least one flow pattern with objects or flow patterns observed in other electronic messages, in order to predict classification of the at least one selected object.

Certain embodiments are to a computer program product, comprising a computer readable medium said computer program comprising: computer program code means for receiving an electronic message; computer program code means for breaking down the electronic message received into component parts; computer program code means for extracting at least one selected object or at least one flow pattern from the component parts; computer program code means for combining and comparing the at least one selected object or the at least one flow pattern with objects or flow patterns observed in other electronic messages, in order to predict classification of the at least one selected object.

Certain embodiments are to a computer program product, comprising a computer readable medium said computer program comprising: computer program code for receiving an electronic message from a live stream source or from an offline source; computer program code for extracting at least one selected object and at least one flow indicator from the electronic message; computer program code for assigning a signature value to the at least one selected object; computer program code for storing the signature valve and the flow indicator from the electronic message; computer program code for comparing the signature value assigned to a database of signature values and assigning a class to the electronic message; computer program code for combining the at least one selected object and at least one flow pattern in order to classify the received electronic message.

Certain embodiments are to a computer program product, comprising a computer readable medium said computer program comprising: computer program code means for receiving an electronic message from a live stream source or from an offline source; computer program code means for extracting at least one selected object and at least one flow indicator from the electronic message; computer program code means for assigning a signature value to the at least one selected object; computer program code means for storing the signature valve and the flow indicator from the electronic message; computer program code means for comparing the signature value assigned to a database of signature values and assigning a class to the electronic message; computer program code means for combining the at least one selected object and at least one flow pattern in order to classify the received electronic message.

Certain embodiments are to a computer program product, comprising a computer readable medium said computer program comprising: computes program code for receiving an electronic message from a live stream source in substantially real time; computer program code for breaking down the electronic message received into component parts; computer program code for extracting at least one selected object or at least one flow pattern from the component pans; computer program code for combining the at least one selected object or at least one flow pattern in order to predict classification of the received electronic messages; computer program code for assigning a signature value to the at least one selected object; computer program code for comparing the signature value assigned to a database of signature values and assigning a class to the electronic message; computer program code for placing the electronic message in the assigned class in substantially real time; and repeating the process on the next electronic message.

Certain embodiments are to a computer program product, comprising a computer readable medium said computer program comprising: computer program code means for receiving an electronic message from a live stream source in substantially real time; computer program code means for breaking down the electronic message received into component parts; computer program code means for extracting at least one elected object or at least one flow pattern from the component parts; computer program code means for combining the at least one selected object or at least one flow pattern in order to predict classification of the received electronic messages; computer program code means for assigning a signature value to the at least one selected object; computer program code means for comparing the signature value assigned to a database of signature values and assigning a class to the electronic message; computer program code means for placing the electronic message in the assigned class in substantially real time; and repeating the process on the next electronic message.

Certain embodiments are directed to a computer program product, comprising a computer readable medium said computer program comprising: computer program code for receiving electronic message data; computer program code for breaking down the electronic message data into components and selecting properties of these components as features; computer program code for combining the features selected to classify the electronic message data; and optionally displaying some portion of the electronic message information.

Certain embodiments are to a computer program product, comprising a computer readable medium said computer program comprising: computer program code means for receiving electronic message data; computer program code means for breaking down the electronic message data into components and selecting properties of these components as features; computer program code means for combining the features selected to classify the electronic message data; and optionally displaying some portion of the electronic message information.

BRIEF DESCRIPTION OF THE DRAWINGS

Various features, aspects and advantages disclosed herein will become better understood with regard to the description provided, appended claims and accompanying drawings where:

FIG. 12 illustrates exemplary displays of information of offensive and non-business information.

DETAILED DESCRIPTION

The following description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In this specification, the word "comprising" is to be understood in its "open" sense, that is, in the sense of "including" and thus not limited to its "closed" sense, that is the sense of "consisting only of". A corresponding meaning is to be attributed to the corresponding words "comprise", "comprised" and "comprises" where they appear. Although, but not limited to, some of the uses of the disclosed methods and/or systems are to identify business communications, non-business communications, marketing programs, offensive material, company identifiers, in-formal communities of interest from the electronic message streams or combinations, thereof. In certain embodiments, this resulting information may be used to for a variety of purposes including, but not limited to, one or more of the following:
- Manage/control the message/object flow;
- Enhance storage models;
- Identify informal communities, purpose and information exchange;
- Prevent data leakage;
- Enhance search and retrieval;
- Prevent proliferation of offensive or inappropriate materials;
- Provide assessment of how systems are being used with an organization;
- Assist Human Resource management within an organization;
- Prevent or identify leakage of sensitive or confidential information.

Figure 1:
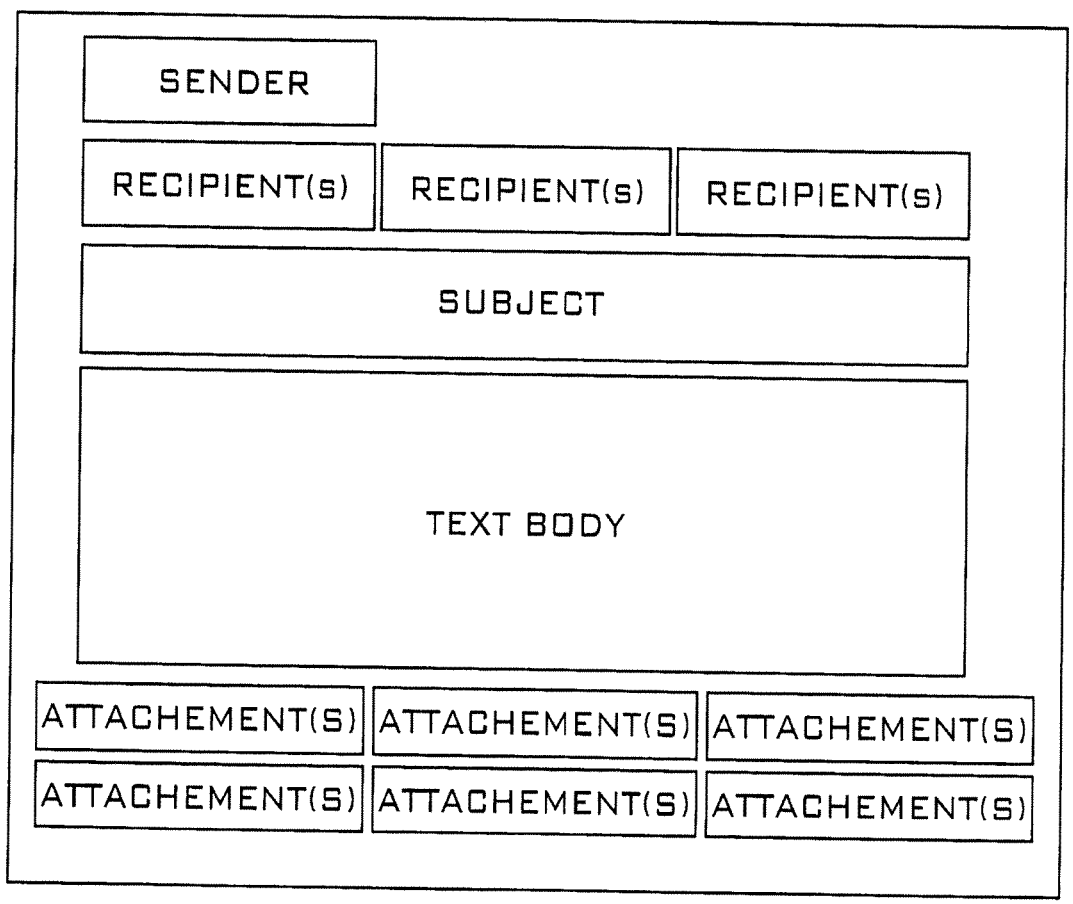
FIG. 1 illustrates some of the types information that may be found in an email and/or other forms of directed electronic messages.
Figure 3:
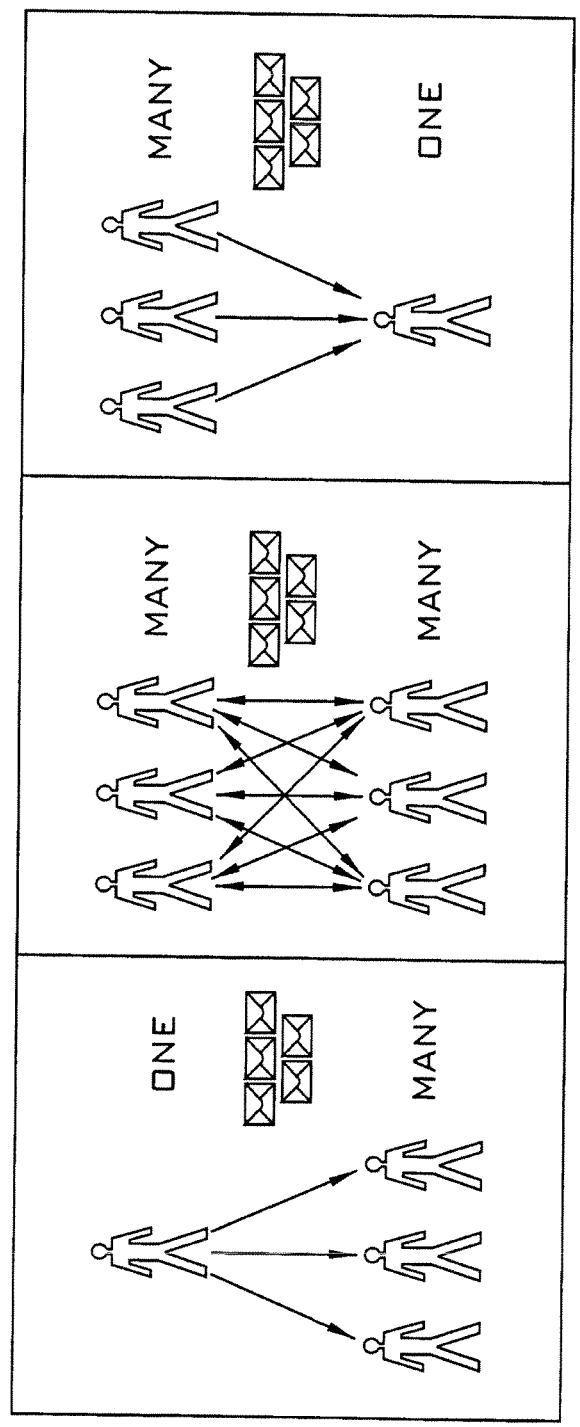
FIG. 3 illustrates some typical sender recipient communication patterns for emails and/or other forms of directed electronic messages.

As illustrated in FIG. 3, email messages pass between multiple senders and recipients, as both one to one and, one to many directed messages. FIG. 1 illustrates that these messages can contain textual information, meta data, and zero or more attachments in the form of encoded payloads. Encoded payloads typically consist of office documents or multimedia documents but may include other information. Some non-limiting examples of these payloads are:
- word (or similar) documents;
- presentation (PowerPoint or similar) documents;
- adobe (pdf);
- spread sheets (excel or similar) documents;
- images of type jpeg, gif, png, tiff;
- videos of container types avi, asf, mkv, mpeg;
- audio of types mp3, aiff, wav;
- URLs—Uniform Resource Locators defining entry points into detached hypertext documents;
- Document Ids—Identifiers allowing the unique retrieval of a document in a detached storage system (e.g.: record numbers);
- Thread Ids—Identifiers allowing the unique retrieval of a thread or topic of detached objects (e.g. Twitter hashtag topics).
- Other types of payloads are also contemplated.

The types of these encoded payloads are growing and the embodiments and/or techniques disclosed herein apply also to payload forms that may emerge in the future.

In general terms, emails pass between individuals or entities as a part of social or business information exchange. They may also be one to one, broadcast, i.e. sending of information from a single source to bulk recipients or many to one.

The communication patterns, coupled with the analysis of selected object and/or objects, may be used in certain embodiments to impute a classification for the object, groups of objects, the message, groups of messages or the parties, communities involved in the message exchange or combinations, thereof.

The following are some non-limiting examples of the classes (types of information) that may be identified using the disclosed embodiments:
- social:
  - business;
  - non business/personal;
  - special interest groups;
  - viral advertising;
  - topical content (such as leaked media content);
- non social/automated:
  - spam;
  - viruses/malware;
  - marketing and other broadcasts;
  - backscatter emails from sender forged spam;
  - logo.

Other classes or combinations of classes, are also contemplated and the above list is not meant to be exhaustive but merely representative of classes. Each of these classes may be further characterized by the pattern of movement observed as the message traverses the path between participating email addresses.

For example, social emails would typically move between participating addresses where the initiation of the movement is likely to be human instigated. Non-social emails are not typically instigated directly by human interaction, but are sent from origin to destination by means of an automatic process. The observed movement of messages within a social network can be characterized by examining the email occurrence counts between source and destinations.

In certain embodiments, occurrence count may be defined as an email frequency count associated with selected subcategories. For example, in emails the subcategory may be the domain part of the address. In certain embodiments, occurrence count may be defined by observing or counting related events that are associated with the socialization or the movement of the emails. For example, rather than counting the emails the embodiments may be counting the receipts and/or log flies. In certain embodiments, the occurrence count may be determined by measuring the volume flow as compared to the count. Combinations of various counting strategies are also contemplated.

To illustrate, for automated emails such as Marketing emails, the occurrence count for the sending email address would typically be high and the occurrence counts for the recipient email addresses would typically be low (in this case a count of 1 for each marketing email). However, since the sending address is typically constant; the occurrences count for that domain is typically high. In contrast, Human instigated emails, such as the sending of a viral video attachment, the occurrence counts for the sending domains are typically much lower.

To continue the illustration, some examples of the patterns of movement observed are:
- Business communications are typically restricted to a group of humans involved in commercial interactions and this pattern is often reflected in the movements observed as these emails traverse between the participating humans. For example, a small number of individual business people belonging to say two companies engaged in Business to Business (B2B) activities. This might be sales people in one company communicating with clients in another. The pattern observed in the emails would reflect the sales activity and negotiations concerning the product, features and price. This pattern may show initial frequent communications between the parties, which would then drop off as a sale was made or lost. Alternatively, the communicating parties might be engaged in a long-standing business relationship such as supplier/vendor. In this case, communication patterns would typically remain constant over periods of time and change when the B2B relationships changed.
- Non-business/personal communications are also typically restricted to a relatively small group of humans; however, the company membership of the group is not typically confined to a small set of companies as with a B2B relationship. The members of non-business/ personal groups may be from a large number of companies and in some cases no two members may work for the same company.

Special Interest Group communications (such as mailing lists) may have many members where the addresses of these members may not be present in the individual communications. These communications can initially appear as 'Broadcast' communications, i.e. they seem to come from one source and propagate to many endpoints, however, when members reply to these communications, their replies typically travel back to the source and then are re-broadcast to members of the group. Other types of Special Interest Group patterns are also possible, when, for example, there is no central communications mechanism such as a mailing list server. These patterns may replicate the patterns seen for Non-business/personal communications, but may be distinguished by their differing membership and content.

Viral Advertising communications may be similar to Non-business/personal communications, however, the content is often fixed and the members of the group are often not limited. Typically, the communication starts within a non-business/personal group, but is then passed on beyond this group crossing over between personal and business groups. This pattern is identifiable by its fixed content and its rapid membership expansion and can be observed to grow exponentially during its initial growth phase.

Topical Content communications may have a similar pattern to viral advertising and can be seen as a superset of the former. Typically, membership expulsion is not as aggressive although it could be said that the only difference is that the communication is not initially commercially driven.

Spam patterns are known in the art and most current spam is initiated by vast 'armies' of compromised 'zombie' PCs. Content from this is distinguished by its high network source diversity. The observed pattern is 'many to many' where the senders are not a member of any of the recipients existing social groups.

Conversely, viruses and malware may not be restricted to originating from unknown senders. In many cases the sender of the virus or malware payload may be a known member of the recipients existing social groups. This pattern is observed due to the nature of the viral attack strategy, where a compromised machine's existing mail contact list may be used as the next targets for an attack.

Marketing communications typically follow a 'broadcast' pattern, where these is a single sender, with a slowing expanding set of recipients. Typically, the recipient list is not pruned over time and only grows.

Backscatter emails from sender forged spam may have a similar pattern to spam, however much of the content in this group is typically generated, not by the spammers, but by automated daemons responding to addressing issues (such as full mailboxes or undeliverable mails). Typically, the recipients for these 'attacks' can be a small set of targets whose addresses have been forged as the sending addresses for the original spam emails.

Logos are image payloads that are typically attached to emails originating from a company. For example, Logos originate from a single company when emails are authored by a client that automatically attaches the payload to emails for the purposes of company branding. These attachments are then inadvertently passed on whenever one of these emails is forwarded. For example, a joke may be sent as part of a non-business communication; it is then passed on or forwarded, many times in succession throughout various non-business social groups. If the pattern is examined in this way it is the same or similar pattern observed for non-business communications, however, if only the original emails are analyzed (by ruling out the emails that show evidence of forwarding), then the emails typically originate from a single domain or small set of domains that are owned by the company and terminate at a large number of different destinations.

As illustrated, the evaluation, monitoring and/or determination of selected communication patterns, coupled with the analysis of selected object and/or objects, may be used in certain embodiments to impute a classification for the object, groups of objects, the message, groups of messages or the parties, communities involved in the message exchange or combinations, thereof.

In certain situations, it may be possible to track all possible destinations. However, in some situations this may not be desirable or practical. Rather than tracking all possible destinations, certain disclosed methods and/or systems may be used to sub-categorize. For example, according to one or more of properties of the email addresses. Email message addresses, may be specified by RFC 2822 and may be formed in multiple parts. SMS uses sending (A Party) and receiving (B Party) phone numbers as 'addresses'. In this case, it may be possible to distinguish between independent and dependant groups by using the number and other associated information that may be available about the number. For example, for the purposes of sub-classifying SMS numbers into groups of independent users, the A party and B party numbers may be distinguished by way of their membership of known company phone lists or address information to compute geographic proximity may be used. Another way may be to use the first few digits as part of this indication Twitter uses a 'Twitter-id' to uniquely identify possible senders, these might be sub-classified by grouping them in terms of other senders they are registered as 'following' i.e. "followers-of" groups. Other ways of to sub-categorize destinations are also contemplated.

For example, there is a local part and a domain, where the local part indicates a specific mailbox and the domain is interpreted as the literal internet address. In practice the domain part has a further association in that it typically, in a business context, belongs to a single commercial entity and resolves by way of DNS MX or A records to one or more MTA servers. Although there are many publicly used internet email domains, such as gmail.com, hotmail.com and yahoo.com, the use of these domains as primary business addresses is typically small and the effects of these domains on the efficacy of the described embodiments is statistically outweighed by the majority of businesses that use their own domains. Additionally, for the case of broadcast flow patterns such as marketing emails where there is typically a single sending address and many receiving addresses, the detection of this pattern is not dependant on the from domain. Also, when these domains participate in non business emails the algorithm relies on counts from multiple domains, so it also is statistically outweighed by the many other domains present in the message flow. Some embodiments may set a requirement of relying on a minimum number of domains before a determination about the flow pattern is made. This requirement may be in the form of a minimum count of domains, where the count is one of 2, 3, 4, 5, 6, 7, 8, 9, 10, 15, 20, 50, 100, 200, 500 through to and including 1000 or greater domains. Alternatively, this requirement may be in the form of a maximum observation time, where the observation time may be required to extend to 1, 2, 3, 4, 5, 6, 7, 8, 9, 10 seconds, 1, 5, 10, 30, 60 minutes, 1, 2, 5, 10 hours or though to and including 1 week or greater observation time during which a count of at least 2 domains must be observed before a determination about the flow pattern is made.

The number of domains and or the time period chosen will depend on the systems or applications scale. In the many cases, each commercial entity owns and/or uses a smell set of domains where the name used is typically associated with the company or organization name or product brand names. This fact allows for the assumption that email to and from a particular domain, or set of domains, is typically associated with a particular commercial entity or entities or product brand names and thereby can be treated as a defined pool of email users. In this way, certain disclosed embodiments use the domain part of the email address as a subcategory of senders or recipients where members of different subcategories are assumed to be independent.

Figure 4:
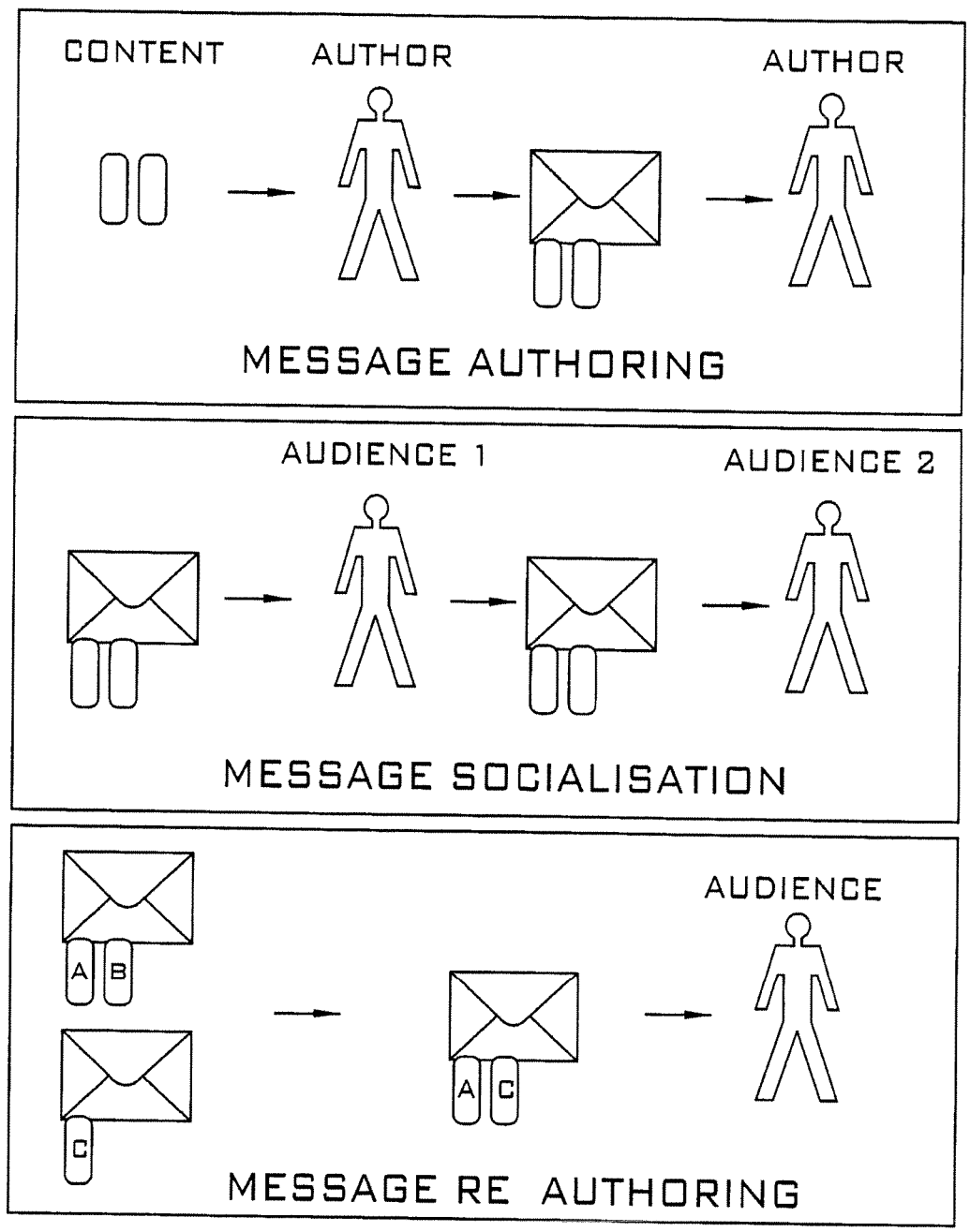
FIG. 4 illustrates that in a social message passing context, content from received messages can be used both in its original form and in combination with other content from other received messages or other sources to create or 're-author' new messages that are then passed on to further recipients.

With respect to the message forwarding behavior, once an email is received, it may then be forwarded, by the user, on to further recipients, where the initial recipient of the email now becomes the new sender and additional recipients for the email are then defined (see, for example, FIG. 4). The email client allows for this type of message passing behavior by preserving much of the original messages format and content. Typically, the metadata subject line is preserved, but is prefixed by a short letter sequence to indicate to the new recipient that the sender is not the original author of the material, for example:

original subject: Check out these pictures
forwarded subject: FW: Check out these pictures
An equivalent example for the social messaging site 'Twitter' might be, for example:
original tweet: Check out these pictures http://bit.ly/12324
forwarded tweet: RT: Check out these pictures http://bit.ly/1234

In certain embodiments, this behavior and others, is detected by the use of a heuristic and/or forms a Boolean feature used by the classification system. A heuristic that might be used to detect that content has been forwarded (in the absence of indicative changes to the subject line) is illustrated in the following example. Consider the following three extracted features:

(i) The email body contains indentation characters or formatting.
(ii) The email body includes text such as 'John Smith wrote:' or 'On Thursday 12th June at 4:15 p.m., John Smith wrote.
(iii) Multiple copies of an email 'sig' are observed. (A 'sig' is a short usually multi-line sequence appended to the end of each email indicating the senders name, position and contact details).

Using these features an example of a Boolean algorithm for determining if an email has been forwarded might be: "IF features 'i' OR 'ii' OR 'iii' are observed then email has been 'FORWARDED'". Other heuristic and/or forms of Boolean algorithms can be used.

Figure 2:
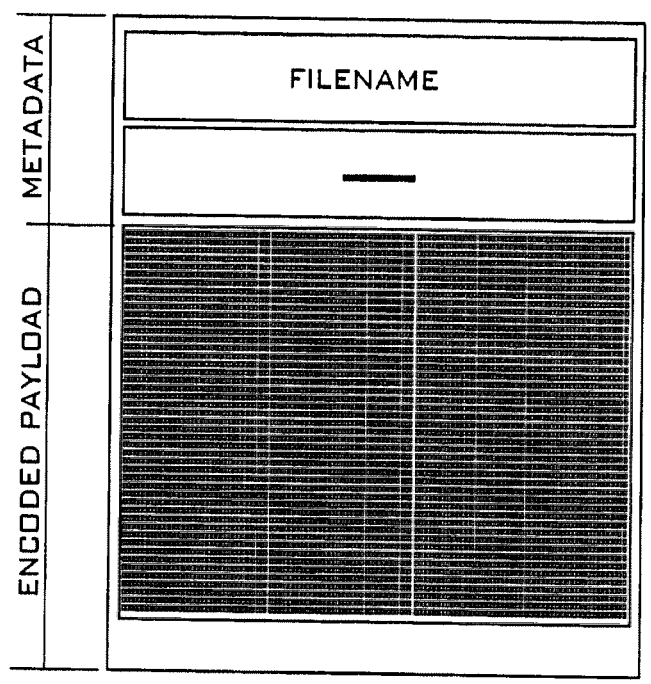
FIG. 2 illustrates that an email attachment and/or other forms of a directed electronic message attachment may have associated metadata.

With respect to bland filenames, emails, when sent, are meta tagged by the client software with the sender address (FIG. 1) and if any attachment payloads are included, the client software generally metatags these with names (FIG. 2). Depending on the type of client software performing the tagging and on the method by which the attachments are added to the email (using a menu to specify files on the file system or dragging and dropping the files onto the client), these names can consist of, for example, either, the original filename used by the operating system or an email client generated name. (e.g. This generated name may be based on the file type and a formulaic naming convention such as att001.jpg, att002.jpg etc).

For the purposes of later display and visualization, the name meta information is recorded by the system along with the payload signature when the signature is first observed by the system. In many case, the first name meta information observed takes the form of one of these bland filenames. Therefore, in certain circumstances, for the purposes of providing extra information to the users of the system, this result is less than satisfactory. For this reason, the system keeps track of the name meta information observed, and if the identical item is later seen with a more descriptive meta name associated with it, then this new information is stored in the database, replacing the older bland name. Bland names are recognized heuristically by the system and names that are not recognized are assumed to be non-bland.

Certain embodiments may use feature extraction analysis methods to identify flow patterns and/or objects within the communication. These objects of interest may consist of a recognizable component and/or various recognizable components, of the message. For example, it could be one or more of the following or combinations thereof:

1. 'text fragments' generated from character ngrams;
2. heuristically identified topics of conversation;
3. attachment payloads or parts of attachment payloads;
4. URLs, Document Ids, Thread Ids or topic hash codes; and/or
5. many other specified objects.

In certain embodiments, the classification of the information may include: the email, the imputed classification of the object, the communication, the sender of the message, the receiver of the message, the message, the community or combinations thereof are determined by analysis of combinations of features. The features may be pert of the email, derived from the email, associated information (such as envelope headers) or combinations, thereof. In certain embodiments, the features may be weighted as part of the analysis. Some non-limiting examples of weighted features that may be combined to determine the classification are:

1. When objects are received and then forwarded on multiple times—track and consider a count of originating domains/senders.
2. When previously unseen objects that co-inhabit emails containing other known objects (where objects in other known groups are excluded) are observed—track and consider these objects.
3. When objects that achieve a high enough numeric threshold based on other factors such as mime-type or membership of certain groups (where this metadata is present)—track and consider these objects.
4. When the presence of certain features is observed, if the object is currently being tracked, then discontinue the tracking of that object. Features for triggering this might be observation of certain object metadata properties such as filetypes determined by filename extension or mimetype.

The weight and combination of values and the mix of objects used for tuning the algorithm's effectiveness will vary depending on the business application and the particular embodiment. For example, the scale of the data input affects bow rapidly a classification can be made with given parameter settings. When input counts are, say 1 million emails per day, thresholds can be set higher as we can afford to look at more messages before we make a classification. If daily counts are low, then with the same settings, a single day of data may not be enough to reach a classification threshold when dealing with previously unseen content. In both of these cases, we are operating on live data, so tuning priority is given to classification speed. Alternatively, if we are to operate in offline mode on a preexisting archive of data, we can afford to examine the entire dataset before making any determinations about previously unseen content. There is no longer a requirement for fast classification so we can set the thresholds much higher and give preference to accuracy rather than speed.

As depicted in (FIG. 1), email messages can optionally contain one or more encoded payloads. Typically, with email, the encoding strategy conforms to the standard Mime encoding (RFC2045), although others are permitted (such as the older unencode standard).

In certain embodiments, once the encoded payloads are un-encoded, the original binary representation of the payload is exposed. These binary payloads are then subjected to a signature generation algorithm, where the algorithm takes binary input and generates a statistically unique code representing the original binary object such that representation of the object is assumed to be statistically unique in a very large population of objects that are likely to be seen by the system, this is to ensure a low likelihood of a 'collision' where two or more objects would be represented by the same code. Certain embodiments will work with smaller population of objects. In certain aspects, large population of objects may be defined as a population of objects that is of a similar or greater magnitude as the scale of the total set of all objects likely to be considered by the embodiment.

In certain applications, uniqueness may be useful although not demanded for the functioning of the disclosed methods and/or systems. Uniqueness is not necessarily binary uniqueness, but may be fuzzy or approximate such that a single signature may match one or more bitwise identical objects that would be seen to be the same object by a user of the system. These signatures can be type dependant, e.g., different signature heuristics can be used for different object types.

Some non-limiting examples of this type of fuzzy signature might be one or more of:
1. Image hashing algorithms that transform similar appearing binary images to a single signature.
2. Metadata-agnostic hashing functions that ignore commonly changing parts of the binary objects when generating unique signatures.
3. Component based signatures that generate a range of sub-signatures, where a match on a subset of sub-signatures would be enough to measure two payloads as having an identical signature.

Figure 6:
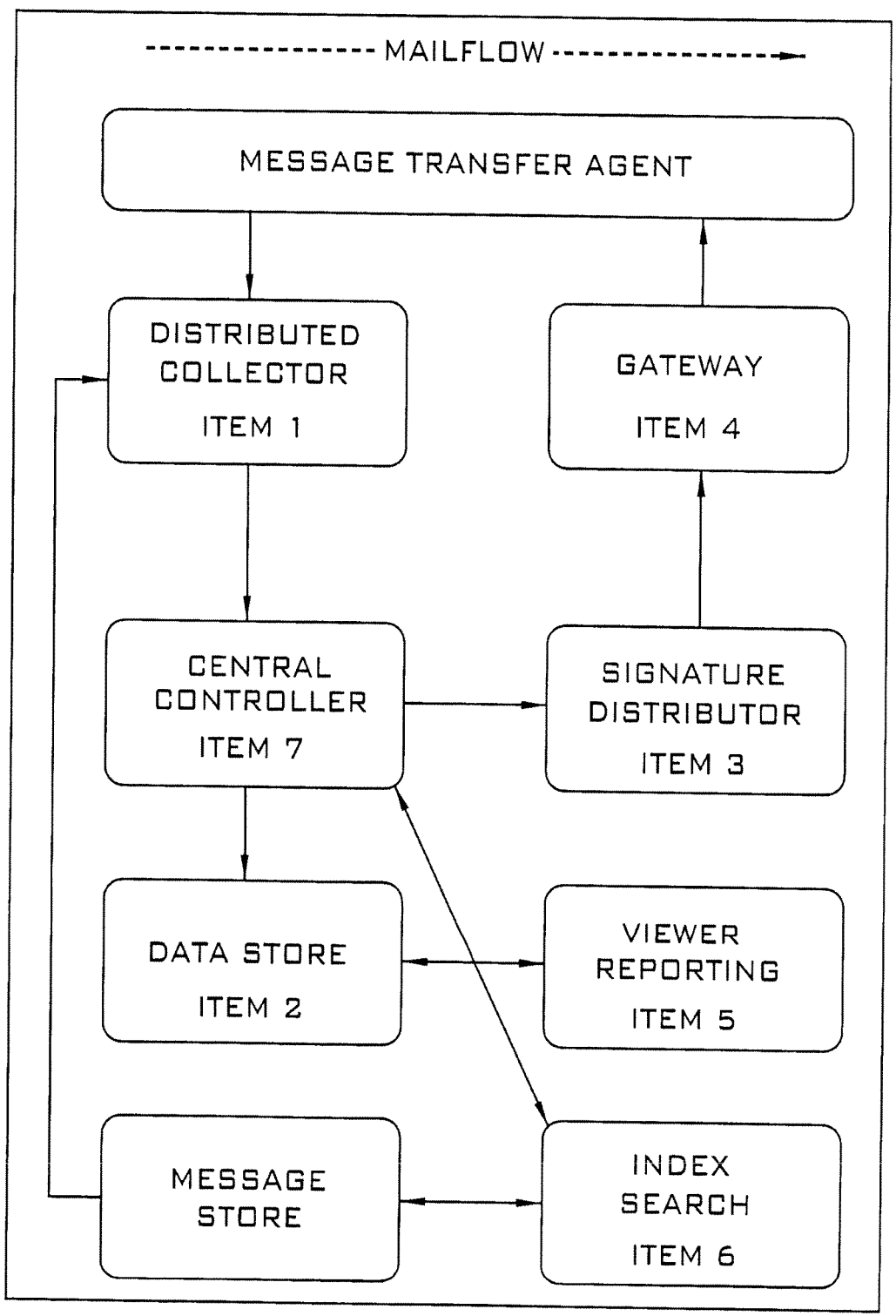
FIG. 6 illustrates methods and/or systems in accordance with certain embodiments.

FIG. 6 illustrates some of the structural components of the Social Exchange Systems Architecture, in accordance with certain embodiments.

As illustrated, emails and other forms of directed electronic message streams are analyzed by breaking them down into components and selecting properties of these components as features. These features are combined using the methods disclosed so as to be indicative of the classification class. Email features are first pre-processed to transform the original message into a form suitable for further processing, e.g. to remove such things as language dependant encoding.

Features used may include, for example, elements of the message such as sender domain, recipient domains, subject line prefix, attachment signatures, attachment name metadata or other objects of interest such as text fragments generated from character in grams, heuristically identified topics of conversation or attachment payloads, parts of attachment payloads or combinations, thereof.

Emails maybe captured from a live stream, captured offline or combinations thereof for processing. Processing consists of 1) pre-processing, i.e. breaking emails into their component parts and 2) feature extraction. The extracted features and flow patterns are used to compute a classification prediction for the payloads discovered. This may be done on each email or some subset of the emails. The number of emails processed may vary depending on the particular application. The pre-processing, for the case of emails, involves steps such as, but not limited to: i) Mime parsing where the mime encoded hierarchical layout and the encoded objects are extracted and decoded; ii) Header extraction where the contents of the encoded headers are converted from their original character set into a reduced or standardized form and/or iii) objects that are themselves encoded are decoded, such as zipped attachments or objects in a form that may be further reduced by parsing according to a known standard such as Microsoft OLE (Object Linking and Embedding). The Feature extraction consists of processing the objects obtained by pre-processing in such a way as to produce an output that 'characterizes' of some quality of the object that is useful or indicative for the purposes of classification.

The extracted payloads are kept initially for a defined time period over which the algorithm is configured to operate. This is done to minimize the cost of converting payloads into summarized forms (if these payloads are later discarded by the algorithm, then they and their associated extracted visualization component are deleted. Payloads that are already known to the system are kept for the purposes of viewing by the visualization system. Statistics about the periodicity of these payloads are kept and displayed to the user.

Figure 12:
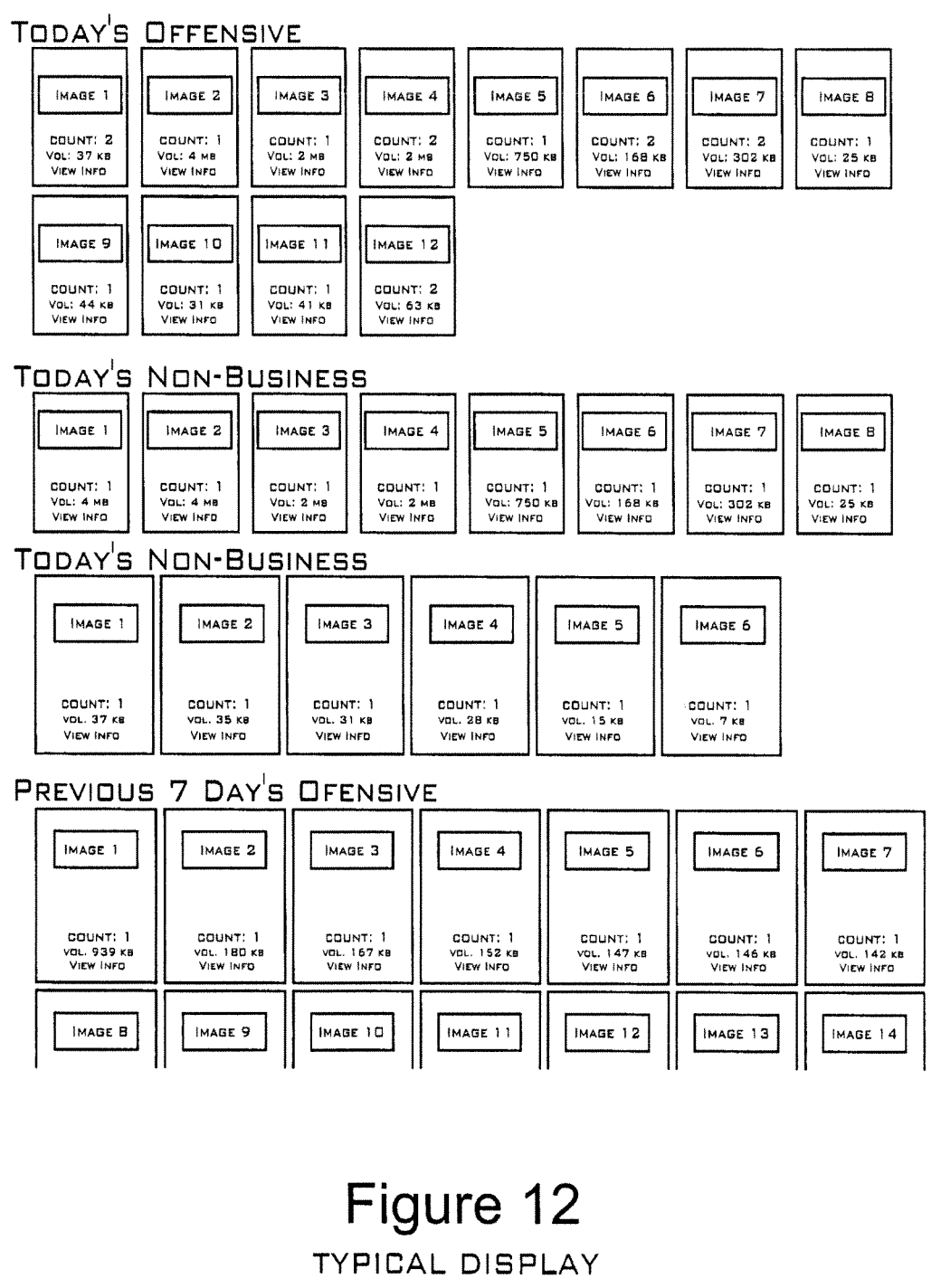

Payloads/objects held by the system may be thumb-nailed to provide a simple image based representation for the purposes of viewing. Payloads may be stored in a hierarchal directory structure, for example, by date and classification to simplify moving older content off system for archival purposes. See, for example, FIG. 12. Other hierarchal directory structures may also be used.

Figure 13:
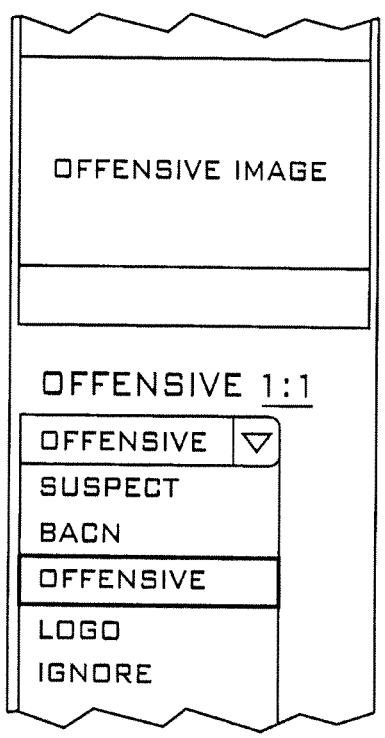
FIG. 13 illustrates an exemplary display of information that was manually classified.

Payloads that have not been seen previously by the system, but that have reached a classification threshold are optionally displayed by the visualization system as candidates for further manual classification. See, for example, FIG. 13. Alternatively, these candidates may be added with or without their associated threshold to a classification database for distribution via the signature distribution system. The thresholds for these automatically classified payloads may continue to be monitored such that at some future time, the initial classification may change once a greater statistical weight of observations modifies the initial determination to a new one.

As illustrated in FIG. 6, the distributed collectors (item 1) are collection and processing agents that are positioned to interleave with the message stream. They transmit information to the central control system for further processing and analysis.

The Control Centre Data Store illustrated in FIG. 6 (item 2 and item 3) is the master central storage system for objects of interest and associated metadata and/or other elements of data required by the system.

The Signature Distributor (item 3) illustrated in FIG. 3 is the subsystem controls to dispatch and update of information to the flow control sub system (gateway) or search sub system (index). Signature databases are distributed from the point of determination to multiple remote gateway locations for the purposes of lightweight payload classification via the signature database distribution system. The content of the databases may be distributed as a full database download or as an incremental update to an existing database.

Remote participating hosts, as well as receiving updates from the Authoritative Signature distribution point, may also participate in the collection of features for the purposes of central signature generation. In this case message features may be made available at the signature generation point without requiring the original email.

The Gateway (item 4), illustrated in FIG. 6, element manages the deployment and update of detecting agents that are positioned to interleave with the message stream. These agents monitor passing live message flow and enabling policy based actions.

As illustrated in FIG. 6, a viewer reporter may also be provided. During processing, payload classification or candidacy status may be recorded along with associated metadata such that a hierarchal (by payload type) and time series view may be presented to the user. The viewer may provide a navigable web based interface utilizing the determined representative thumbnails of the objects to create a drillable forensic discovery interface.

An Index Search (item 6) function may also be provided. During processing information is extracted and compiled that allows the building and searching of an auxiliary detached index to be used against an existing message store for the purposes of information retrieval.

The Central Controller (item 7) shown in FIG. 6 collects data from multiple distributed collection sources. The data typically contains some extracted metadata and classification candidates.

Figure 7:
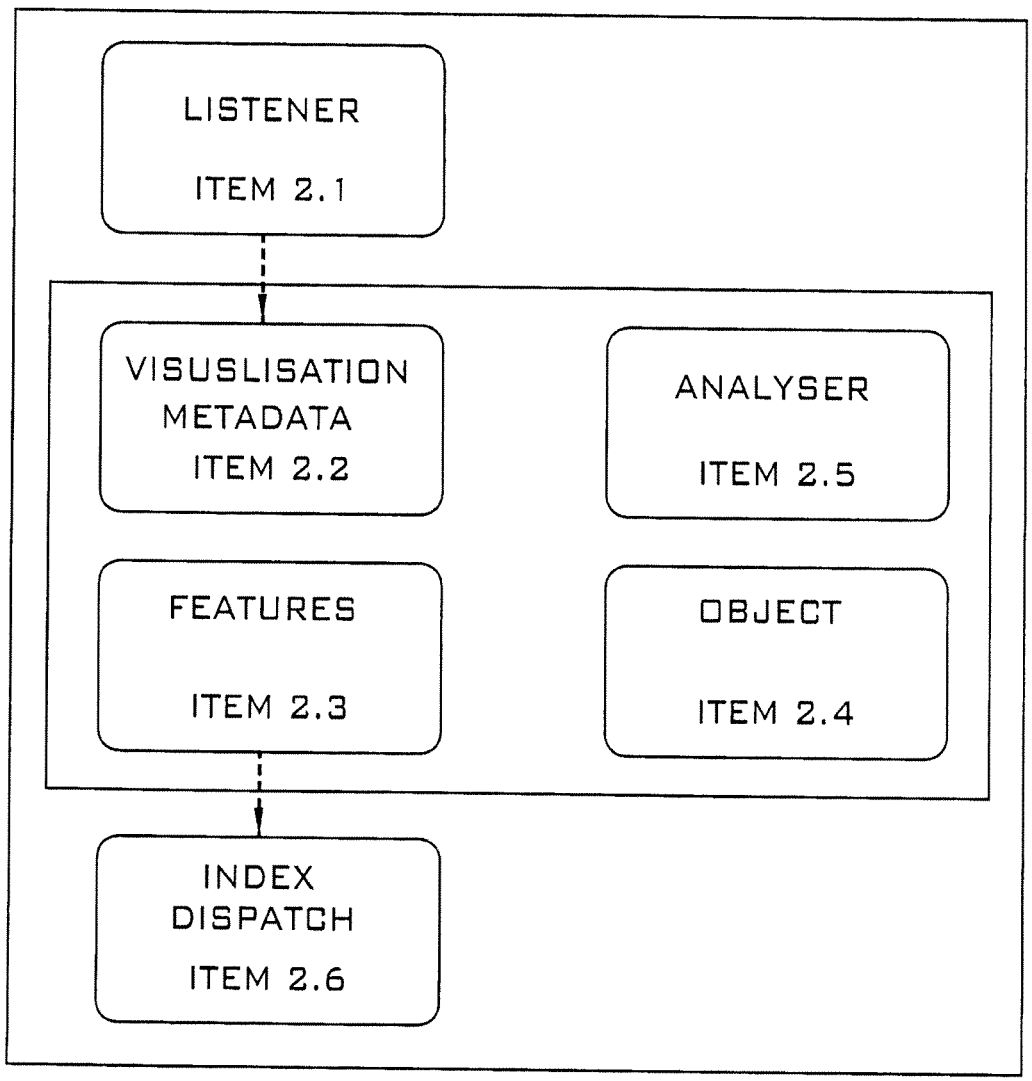
FIG. 7 illustrates control centre data storage system for objects of interest and associated metadata, in accordance with certain embodiments.

The Data Store (item 2) in FIG. 6 is illustrated in greater detail in FIG. 7, in accordance with certain embodiments. This may be the central storage system for objects of interest and associated metadata. Some of the process components illustrated in FIG. 7 are:

Visualization metadata (item 2.2)—Metadata associated with the objects of interest, such as thumbnails, summaries and object meta information, such as filenames, sizes, annotations, frame count, duration, height, width, or combinations, thereof.

Features (item 2.3)—features associated with the objects such as message-ids, count, volumes, dates and times or combinations, thereof.

Analyzer (item 2.5)—Performs further processing and extraction of stored data to create auxiliary metadata such as thumbnails for visualization. Holding up-to-date databases of signatures allows the user to make an online (live in the stream) determination of the email class and thereby be in a position to automatically or substantially automatically apply a predetermined rule and execute an 'action' on the email message in real time or substantial real time. In certain embodiments, real time means in a manner that does not seriously impact the existing end to end latency for an email traversing the system.

Certain embodiments may also be applied to offline email, where, for example, the email has been stored in a storage system after already having been delivered to the destination mailbox, perhaps as part of an archive storage system.

Objects (2.4)—Database of unmodified objects of interest, these are retrieved on demand for the visualization system.

Figure 8:
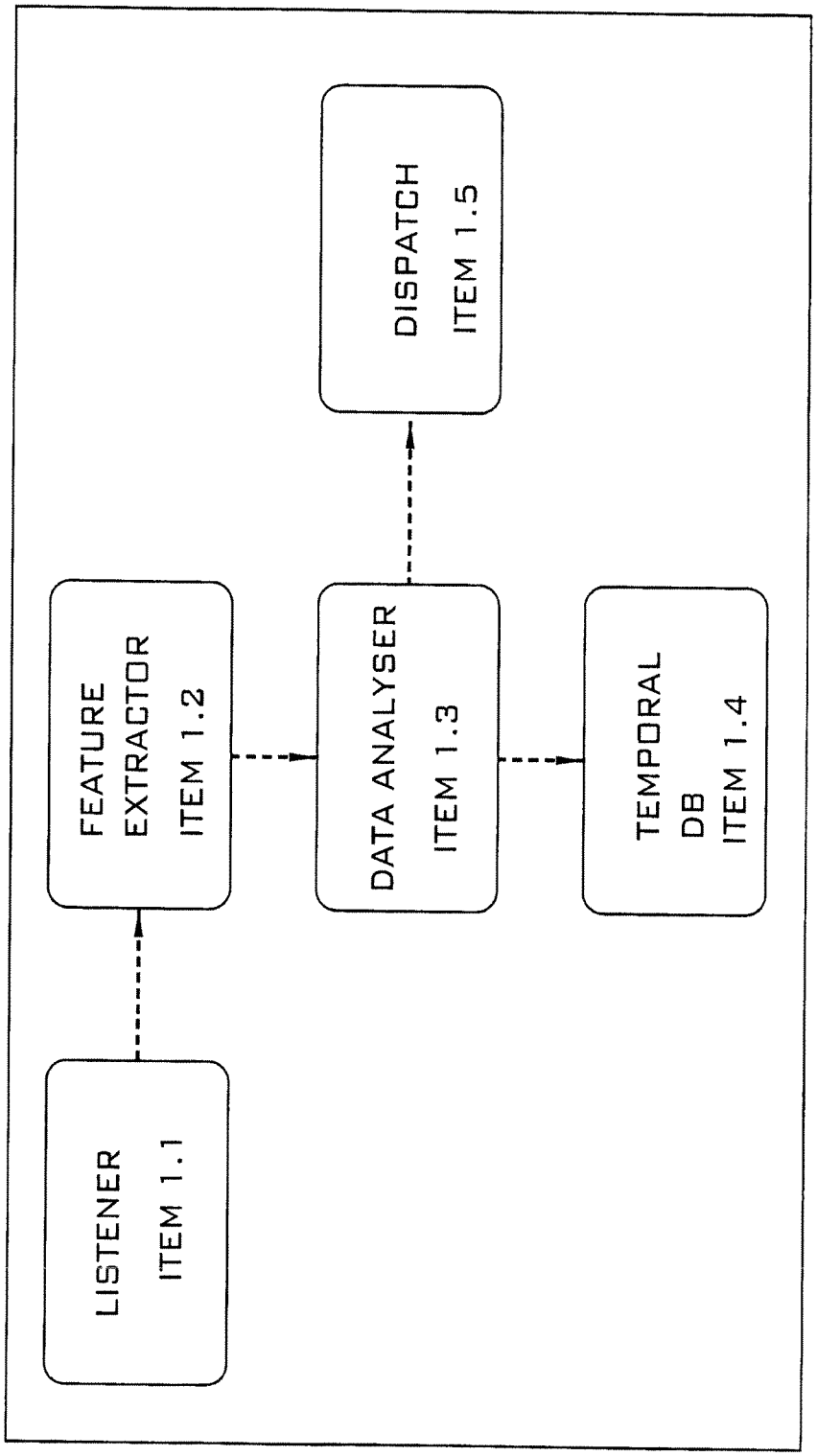
FIG. 8 illustrates collection and processing agents that are positioned to interleave with the message stream, in accordance with certain embodiments.

In accordance with certain embodiments, the Distributed Collectors illustrated as item 1 in FIG. 6 is shown in further detail in FIG. 8. These are collection and processing agents that may be positioned to interleave with the message stream. For email systems, this would typically be alongside the message transfer agent (MTA). These collectors can be placed within large scale scanning infrastructure for in-the cloud message scanning services or alongside enterprise MTA's in a distributed message flow environment. Some of the process components illustrated in FIG. 8 are:

1. Feature Extractor (item 1.2)—Extracts features from message content and envelope.
2. Data Analyzer (item 1.3)—Performs co-association component of algorithm to determine classification metadata for each message.
3. Temporal DB (item 1.4)—Stores temporary data over a defined time period for the purposes of allowing threshold detection in the time domain.

Figure 9:
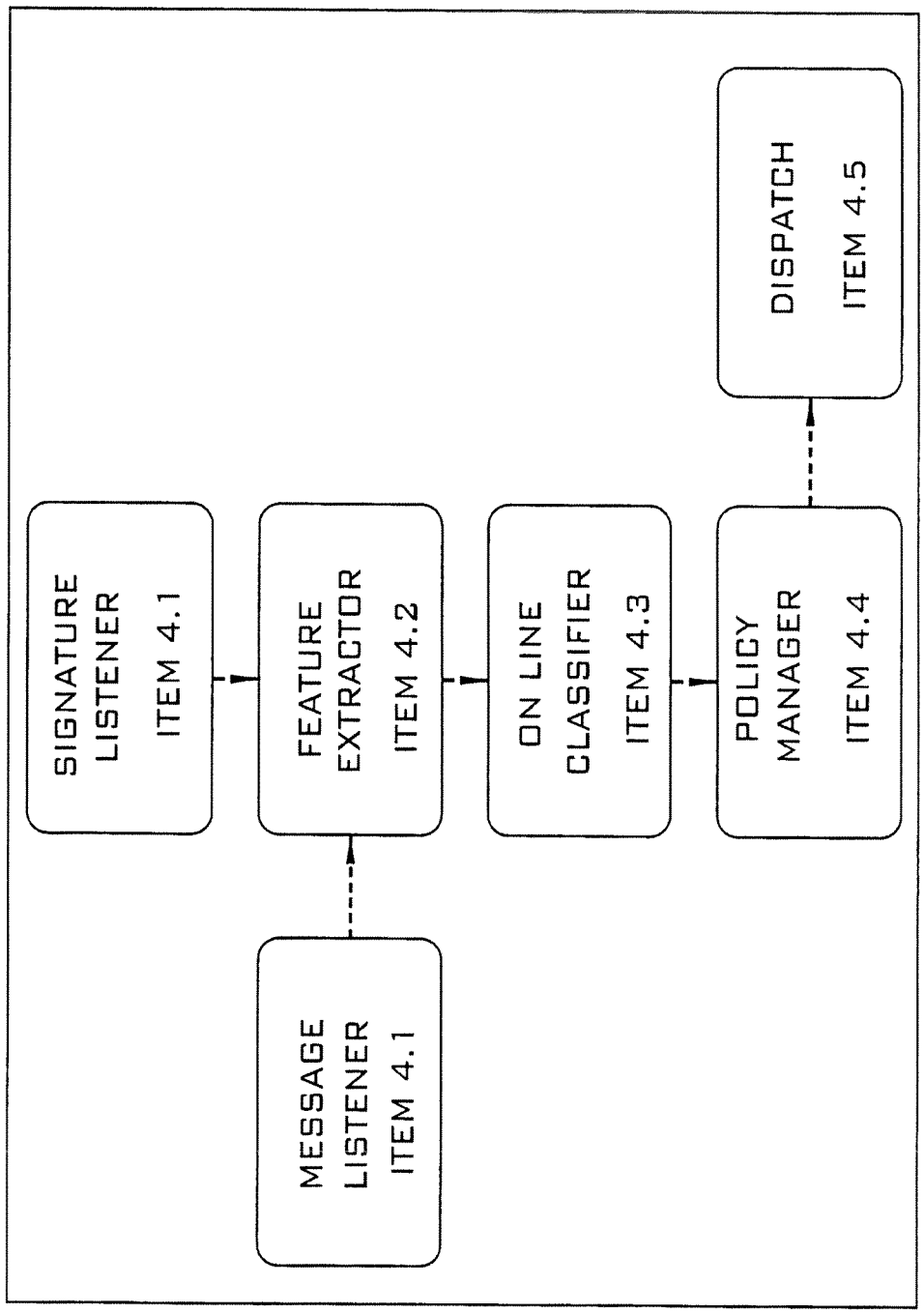
FIG. 9 illustrates the element that manages the deployment and update of detecting agents that are positioned to interleave with the message stream, in accordance with certain embodiments.

In accordance with certain embodiments, the Gateway shown in FIG. 6, as item 4 is shown in further detail in FIG. 9. This element manages the deployment and update of detecting agents that may be positioned to interleave with the message stream. These agents monitor passing live message flow and enabling policy based actions. Some of the process components illustrated in FIG. 9 are:

Feature Extractor (item 4.2)—Extracts features from message content and envelope.

Online Classifier (item 4.3)—Takes features and signatures and algorithmically determines a final classification.

Policy Manager (item 4.4)—Takes result of classification of messages (signatures+features) and applies policy to messages.

Figure 10:
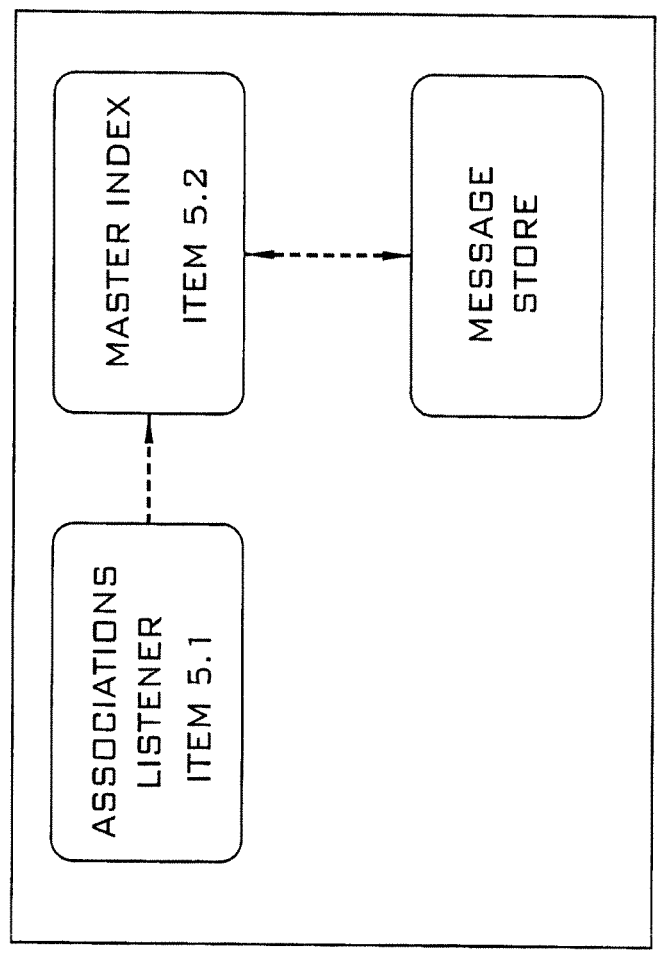
FIG. 10 illustrates the index search element that allows the building and searching of an auxiliary detached index to an existing message store for the purposes of information retrieval, in accordance with certain embodiments.

The Index Search (item 6) illustrated in FIG. 6, uses the master index item 5.2, shown in FIG. 10, in accordance with certain embodiments. In certain embodiments, this element allows the building and searching of an auxiliary detached index to an existing message store for the purposes of information retrieval. The Master index (item 5.2), see FIG. 10, stores indexes associating metadata to a message key for the purposes of Information retrieval. Metadata can consist of features that were extracted and/or classifications that were determined. The Search and Retrieval Interface allows searches to be performed on the master index resulting in a reference into the master store.

Figure 11:
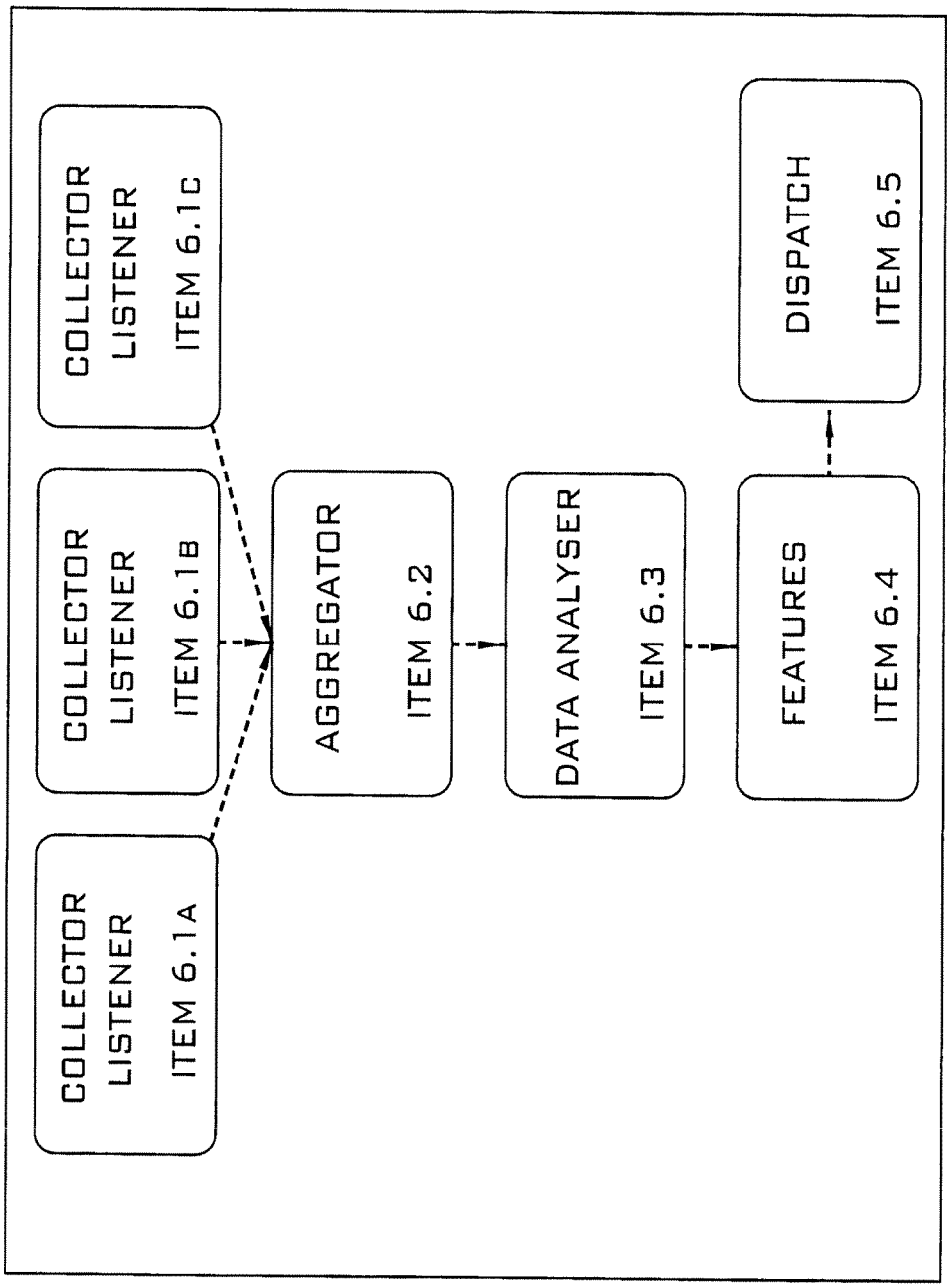
FIG. 11 illustrates the control centre that collects data from multiple distributed collection sources, in accordance with certain embodiments.

In accordance with certain embodiments, the Control Centre is illustrated in FIG. 11. One of the functions of the Control Centre is to collects data from multiple distributed collection sources. The data contains some extracted metadata and classification candidates. Illustrated in FIG. 11, is an aggregator (item 6.2) that takes data supplied from multiple listeners and combines and/or presents the data to the analyzer. Also shown is a Data Analyzer (item 6.3). One of the functions of the Data Analyzer is to take the extracted metadata and perform further analysis, resulting in new classification candidates. These are combined and weighted with the classification candidate information supplied by the remote collectors to reach a further classification determination. In certain aspects, this may be the final classification determination. Also shown in FIG. 11, are item 6.4 the Features function. One of the functions of the Features (message features+classification) data is to present to the dispatcher this information for storage.

Example of an Embodiment—Non Business—Social Attachments

The following example illustrates certain aspects of the disclosed systems and/or methods by showing the treatment of non-business social attachments.

Figure 5A:
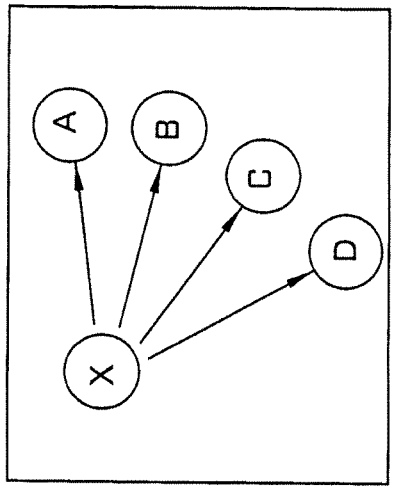
FIG. 5A illustrates an example of a typical business or organization flow of electronic message streams.

One assumption of the illustrated application, is that attachment payloads that travel between a wide number of disparate senders and recipients are likely to be non business, where as payloads that are exchanged between a smaller number of disparate senders are more likely to be business, with some exceptions. (See FIG. 5A).

An email may be defined to be circulated or socialized if it is received and then forwarded on to another recipient (See FIG. 4). An email may be defined to be authored if it contains no previously recognizable (by the system) components. An email maybe defined to be re-authored if it contains a melange of previously seen components, but in a combination that has not previously been observed by the system.

Figure 5B:
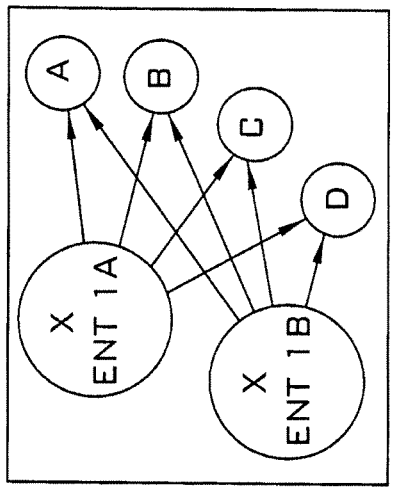
FIG. 5B illustrates an example of a typical broadcast flow of electronic message streams.
Figure 5C:
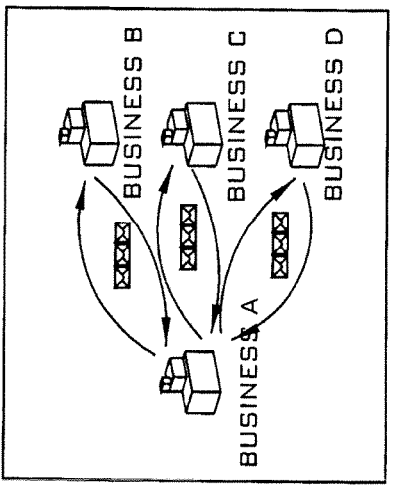
FIG. 5C illustrates an example of a typical non-business flow of electronic message streams.
Figure 5D:
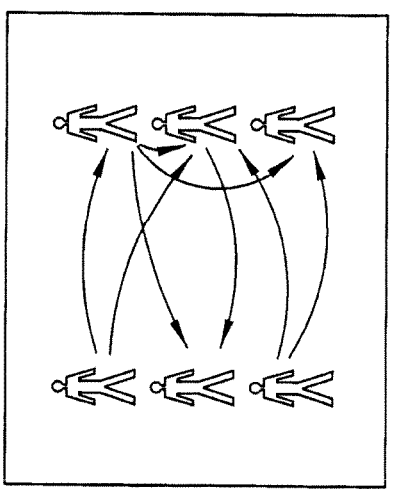
FIG. 5D illustrates an example of a typical logo (payload) flow within electronic message streams.

The configurations of the payload flow patterns (See, FIGS. 5A and 5B) represent both the objects value and its intended purpose. Widely circulated objects infer that the value of the object is relevant to a large number of recipients.

Example Classes of Attachments/Social Use of "Objects of Interest"

Non business:
  funny pictures.
Business:
  viral marketing.
Offensive:
  pornography.
Decorative:
  background colors, borders.
Logo:
  company branding enforced by policy.

Certain embodiments capture the message flow pattern algorithmically and use this information to classify the objects of interest contained within the messages into one of the following two categories:
  Non-business—social attachments: i.e. attachments that are passed socially between human recipients by means of messages, where the recipients for these messages form a different set of individuals to the group that is normally corresponded with as part of normal daily business communications.
  Logos—company related attachments that typically are attached to emails emanating from at least one commercial entity. Typically, this attachment is an image displaying a company logo, name of the company and sometimes further information about the business such as: motto, address, and branding information. Typically, including this attachment to all outgoing mail from the commercial entity is dictated by corporate policy. These policies are typically enforced by setting all email clients within the company to automatically append the corporate logo to each outgoing message or this attachment is automatically added at the corporate mail gateway.

In addition to these classified categories, a further category is kept and manually maintained for the purpose of stop listing common payloads that mimic the social flow patterns of the non-business or Logo category, but do not strictly fit into these categories in terms of their social use.

In this example, the classification of Non-business may be determined by one or a combination of the following characteristics:
  1. When payloads are received, and forwarded on multiple times, it can be observed that the count of originating domains; this number is greater than N domains, where N is one of 2, 3, 4, 5, 6, 7, 8, 9, 10, 15, 20, 50, 100, 200, 500 through to and including 1000 or greater domains. Or, alternatively, N is the number of domains collected when the observation time may be required to extend to 1, 2, 3, 4, 5, 6, 7, 8, 9, 10 seconds, 1, 5, 10, 30, 60 minutes, 1, 2, 5, 10 hours or though to and including 1 week or greater time during which a count of at least 2 domains must be observed.
  2. Where previously unseen payloads co-inhabit emails containing other known non-business payloads.
  3. Where attachments in other known payloads, such as logos, may be ignored.
  4. As payloads that achieve a high enough numeric threshold based on other factors such as mime-type and/or membership of certain attachment name extensions where this metadata is present.

The determination of the non-business classification may also be undone before the algorithm concludes if a high enough negative weight threshold is reached based on other factors such as, for example, determining the membership of certain attachment name extensions or mime-types (where this metadata is present).

In these embodiments, the classification of Logo is here defined, as payloads that show a 'unique sending domain' to 'receiving count' ratio that is less than M, where M might take the value of 0.7. In certain aspects the M value may be 0.4, 0.5, 0.6, 0.7, 0.8, 0.9, 1.0 or greater.

The unique sending domain count may be performed by counting the number of message occurrences seen to emanate from the same domain of origin. The receiving count may be merely the total count of emails containing the object of interest being considered. With these determinations, there is a specified minimum count of instances that must be observed before the thresholds are considered. For the example of logo determination, a typical minimum count might be 5, such that we must see 5 occurrences of the item before its sending domain to receiving count ratio is considered. There is also a minimum payload size below which payloads are not counted or considered as indicative. A typical value for this lower threshold is 20 kilobytes. These values are permitted to vary for the purposes of tuning the algorithm's effectiveness. In certain embodiments, the value for this lower threshold may 10, 15, 20, 25 or 30 kilobytes. Other values may also be used depending on the circumstances. In certain aspects, Non-business analysis effectiveness may be improved by increasing the domain diversity and/or the time window over which the trigger thresholds are considered.

Compared to existing methods and systems, the present inventions has one or more of the following advantages: reduces IT storage space; reduce or make management aware of how much non-work related videos, personal emails, etc., are being moved through the system; control and/or monitor the proliferation of potentially inappropriate inbound and outbound activity (such as pornography, cyber-bullying, sensitive materials that could be stolen and emailed out of the company); efficient analysis and/or categorization of directed electronic message streams; perform the analysis and/or categorization in real time or substantially real time; perform the analysis and/or categorization without having to load additional software onto the network; and/or scalability. Allows image content policies to be imposed on an email stream (eg: Block Email/Remove Attachment) where company logos are detected and excluded from consideration by the policy.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example of series of equivalent or similar features.

The methods in accordance with the disclosed embodiments may be implemented using a general purpose computer system. The methods may be implemented as software, such as one or more application programs executable within the computer system. In particular, the steps of the method are affected by instructions in the software that are carried out within the computer system. The instructions may be formed as one or more code modules, each for performing one or more particular tasks. The software may also be divided into two separate parts, in which a first part and the corresponding code modules performs the method and a second part and the corresponding code modules manage a user interface between the first part and the user. The software may be stored in a computer readable medium, including the storage devices described herein. The software is loaded into the computer system from the computer readable medium and then executed by the computer system. A computer readable medium having such software or computer program recorded on the computer readable medium is a computer program product. The use of the computer program product in the computer system preferably affects an advantageous apparatus.

The computer system comprises a computer module, input devices such as, but not limited to, a keyboard, touch screen, a mouse pointer device, and output devices including a display device. An external Modulator-Demodulator (Modem) transceiver device may be used by the computer module for communicating to and from a communications network. The network may be a wide-area network (WAN), such as the Internet or a private WAN. The computer may be connected to the network using a high capacity (e.g., cable) connection and the modem may be a broadband modem. A wireless modem may also be used for wireless connection to the network.

The computer module typically includes at least one processor unit, and a memory unit for example formed from semiconductor random access memory (RAM) and read only memory (ROM). The computer module may also include, but is not limited to, a number of input/output (I/O) interfaces including an audio-video interface that couples to the video display and loudspeakers, an I/O interface for the keyboard and mouse and an interface for the external modem. The computer module also has a local network interface that permits coupling of the computer system to a local computer network, known as a Local Area Network (LAN). The local network may also couple to the wide-area network via a connection.

Storage devices are provided and typically include, but are not limited, to a secondary storage device such as local hard disk drive (HDD) or remote network attached storage device (NAS).

Typically, the application programs are resident on the secondary storage device and read and controlled in execution by the processor. Intermediate storage of such programs and any data fetched from the networks may be accomplished using the semiconductor memory, possibly in concert with the hard disk drive. In some instances, the application programs may be supplied to the user encoded on one or more CD-ROM and read via the corresponding drive or alternatively may be read by the user from the networks. Still further, the software can also be loaded into the computer system from other tangible computer readable media. Computer readable media refers to any storage medium that participates in providing instructions and/or data to the computer system for execution and/or processing. Examples of such media include floppy disks, magnetic tape, CD-ROM, a hard disk drive, a ROM or integrated circuit, a magneto-optical disk or a computer readable card such as a PCMCIA card and the like, whether or not such devices are internal or external of the computer module. Examples of computer readable transmission media that may also participate in the provision of instructions and/or data include radio or infra-red transmission channels as well as a network connection to another computer or networked device and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display.

The methods to be described may also be implemented, at least in part, in dedicated hardware such as one or more integrated circuits performing the functions or sub functions to be described. Such dedicated hardware may include dedicated processors, digital signal processors or one or more microprocessors and associated memories.

A number of methods, servers, systems and computer program products have been disclosed with reference to embodiments of the invention. The embodiments disclosed are applicable to the computer and data processing industries, amongst others.

The foregoing describes only some embodiments of the inventions, and modifications and/or changes can be made thereto without departing from the scope and spirit of the disclosed embodiments, the embodiments being illustrative and not restrictive.

Furthermore, the inventions have described in connection with certain embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

The invention claimed is:

1. A method of analyzing data from electronic message information comprising:
   receiving electronic message data;
   breaking down the electronic message data into components and selecting properties of these components as features;
   combining the features selected to classify the electronic message data; and
   optionally displaying some portion of the electronic message information;
   wherein the features identified may be used to infer information about the features, groups of features, the electronic message, the senders of the electronic message, or some other properties associated with the electronic message.

2. The method of claim 1, wherein the combined features are compared with other features observed in other electronic messages, in order to classify the electronic message.

3. The methods of claim 1, wherein the electronic message has a defined sender and one or more defined recipient addresses and wherein the addresses define the sender and recipients.

4. The methods of claim 1, wherein the electronic message moves from sender to recipients by way of a transport layer.

5. The methods of claim 1, wherein the feature may be a definable binary or text component and wherein the components may be reduced to an identifier by way of a fuzzy reduction algorithm, hashing function or combinations thereof.

6. The methods of claim 1, wherein the identifiers are stored in a secondary storage system for the purposes of later retrieval.

7. The methods of claim 1, wherein the Information inferred about the components is calculated by analyzing one or more features associated with the electronic message.

8. The methods of claim 1, wherein the features may be collected from electronic messages passing through a single node, may be collected from multiple nodes over a distributed collection framework or combinations thereof.

9. The methods of claim 1, wherein features may be extracted from the content of the electronic message, from information associated with the transport layer used to transport the electronic message or combinations thereof.

10. The method of claim 9, wherein features associated with the transport layer may be extracted from the electronic message addresses and used to determine message path traversal.

11. The method of claim 1, wherein an algorithm is used to generate an output that combines the information inferred about the components which is calculated by analyzing one or more features associated with the electronic message, and these features may be collected from electronic messages passing through a single node, may be collected from multiple nodes over a distributed collection framework or combinations thereof and the features associated with the transport layer may be extracted from the electronic message addresses and used to determine message path traversal resulting in the output which defines the information about the features, groups of features, the electronic message, the senders of the electronic message or some other properties associated with the electronic message.

12. The methods of claim 1, wherein the inferred information matches a defined classification schema.

13. The methods of claim 1, wherein the output is stored so that it is suitable for distribution over a computer network.

14. The methods of claim 1, wherein the objects are stored in a secondary storage system in association with the identifiers where the object may be a definable binary or text component and the components may be reduced to an identifier by way of a fuzzy reduction algorithm, hashing function or combinations thereof.

15. The methods of claim 1, wherein the objects are subjected to a further summarization process for the purposes of making summarization information available to a visualization system.

16. The methods of claim 1, wherein the electronic message data is received from at least one stream source, from an offline source or combinations thereof.

17. The methods of claim 1, wherein comparing further includes an occurrence count that is associated with the at least one selected feature.

18. The methods of claim 1, wherein the occurrence count is determined by observing or counting related events that are associated with the movement of the electronic message.

19. The methods of claim 1, wherein the occurrence count is determined by counting the receipts or log files.

20. The methods of claim 1, wherein the occurrence count is the electronic message frequency count associated with selected subcategories.

21. The method of claim 20, wherein the selected subcategory is a domain part of the address.

22. The methods of claim 1, wherein the occurrence count is determined by measuring the volume flow and comparing to the occurrence count.

23. The methods of claim 1, wherein the occurrence count is determined based on a passage of time.

\* \* \* \* \*